(12) United States Patent
Ligman

(10) Patent No.: US 9,708,780 B1
(45) Date of Patent: *Jul. 18, 2017

(54) TRACK DRIVE APPARATUS FOR SCREEDING CONCRETE

(71) Applicant: Ligchine International, LLC., Floyds Knobs, IN (US)

(72) Inventor: Peter A. Ligman, Clinton, WI (US)

(73) Assignee: LIGCHINE INTERNATIONAL CORPORATION, Floyds Knobs, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/226,730

(22) Filed: Aug. 2, 2016

Related U.S. Application Data

(63) Continuation of application No. 15/048,198, filed on Feb. 19, 2016, now Pat. No. 9,404,272, which is a continuation of application No. 14/600,903, filed on Jan. 20, 2015, now Pat. No. 9,297,171.

(60) Provisional application No. 62/000,257, filed on May 19, 2014, provisional application No. 61/928,736, filed on Jan. 17, 2014.

(51) Int. Cl.
| | |
|---|---|
| *E01C 23/01* | (2006.01) |
| *E01C 23/06* | (2006.01) |
| *E01C 19/22* | (2006.01) |
| *E01C 19/23* | (2006.01) |

(52) U.S. Cl.
CPC .............. *E01C 23/01* (2013.01); *E01C 19/22* (2013.01); *E01C 19/23* (2013.01); *E01C 23/06* (2013.01)

(58) Field of Classification Search
CPC .......... E01C 19/48; E01C 19/42; E01C 19/30; E01C 19/22; E01C 19/006; E01C 23/06; E02F 3/847; B62D 55/02; B60S 9/12
See application file for complete search history.

(56) References Cited

U.S. PATENT DOCUMENTS

| | | | | |
|---|---|---|---|---|
| 4,655,633 A * | 4/1987 | Somero | ................ | E01C 19/006 404/118 |
| 4,930,935 A * | 6/1990 | Quenzi | ................ | E01C 19/405 404/114 |
| 5,009,546 A * | 4/1991 | Domenighetti | ........ | B62D 55/02 404/110 |
| 5,039,249 A * | 8/1991 | Hansen | ................ | E04F 21/242 404/114 |
| 6,129,481 A * | 10/2000 | Tapio | ...................... | E04G 21/10 404/102 |
| 6,481,924 B1 * | 11/2002 | Smolders | ................ | B62D 7/02 180/408 |
| 6,530,721 B2 * | 3/2003 | Yost | ...................... | E01C 19/006 404/118 |
| 6,695,532 B2 * | 2/2004 | Somero | ................... | E01C 19/29 404/118 |
| 6,729,796 B1 * | 5/2004 | Green | ................... | E01C 19/006 404/118 |

(Continued)

*Primary Examiner* — Abigail A Risic
(74) *Attorney, Agent, or Firm* — Middleton Reutlinger

(57) ABSTRACT

An apparatus for screeding concrete to produce a level finished surface that includes a frame assembly, a boom assembly secured to the frame assembly at a first end and to a screed head at a second end, and a track drive assembly having a pair of driven tracks spaced from at least one wheel, the tracks and the wheels each rotatably secured to the rigid frame assembly.

9 Claims, 7 Drawing Sheets

(56) References Cited

U.S. PATENT DOCUMENTS

| | | | |
|---|---|---|---|
| 6,857,816 B2* | 2/2005 | Saito | E02D 3/039 |
| | | | 180/9.21 |
| 6,860,676 B2* | 3/2005 | Pont Feixes | E04F 21/247 |
| | | | 404/118 |
| 7,044,681 B2* | 5/2006 | Quenzi | E01C 19/006 |
| | | | 404/114 |
| 7,121,762 B2* | 10/2006 | Quenzi | E01C 19/006 |
| | | | 404/114 |
| 7,144,191 B2* | 12/2006 | Kieranen | E01C 19/40 |
| | | | 404/84.05 |
| 7,195,423 B2* | 3/2007 | Halonen | E01C 19/006 |
| | | | 404/101 |
| 7,540,686 B2* | 6/2009 | Heims | E01C 19/40 |
| | | | 404/102 |
| 7,685,929 B2* | 3/2010 | Mainville | B66F 3/28 |
| | | | 91/168 |
| 8,591,142 B2* | 11/2013 | Mittleman | E01C 19/48 |
| | | | 404/96 |
| 8,794,868 B2* | 8/2014 | Fritz | E01C 19/006 |
| | | | 404/84.5 |
| 2007/0116520 A1* | 5/2007 | Quenzi | E01C 19/006 |
| | | | 404/114 |
| 2010/0215433 A1* | 8/2010 | Fritz | E01C 19/006 |
| | | | 404/84.5 |
| 2012/0183350 A1* | 7/2012 | Mittleman | E01C 19/48 |
| | | | 404/101 |

* cited by examiner

TRACK DRIVE APPARATUS FOR SCREEDING CONCRETE

BACKGROUND OF THE INVENTION

Field of the Invention

The present invention relates generally to a method and apparatus for troweling or screeding concrete and more specifically to a track drive concrete screeding apparatus for screeding a poured concrete surface. The track drive is rotatable about a central axis such that the screeding apparatus may be moved parallel to a poured concrete surface that is being finished. Alternatively, the screeding apparatus may simply be operated as a "drive-in" machine when it is equipped with a fixed screed blade.

Description of the Related Art

In the construction industry when liquid concrete is poured to produce a finished surface it must be quickly and carefully smoothed or screeded, so that when the concrete sets it produces an even, level surface. Since this level surface is almost always a foundation for additional construction, machine base applications, or for vertical storage such as warehousing and shelving space, it is highly desirable to produce a surface that is consistently level over its entire area. In large poured areas it is unwieldy and labor intensive to manually level and smooth a poured concrete surface as well as extremely difficult to maintain a consistent finished grade.

In order to aid in the screeding of large surface area concrete pours, a variety of concrete screeding or troweling machines have been accepted into use in the art. These machines typically include a screed head comprising a flat troweling surface for contacting the poured concrete mounted on a boom that is mechanically extended and retracted across the concrete surface to produce a smooth surface finish. Many of these prior art devices include various systems for leveling the screed head relative to a reference plane such that the finished surface is relatively flat once it is screeded.

The leveling systems in prior art screeding devices may encompass laser eyes mounted on the screed head structure that detect a laser beam projected at a predetermined level reference height above grade. Thus the screed head may be adjusted using a wide variety of adjustment mechanisms to a predetermined grade level by aligning said laser eyes with a projected laser beam. Furthermore, many of these devices provide automated systems for adjusting the screed head upwardly or downwardly to a level reference plane, thus obviating the need for manual alignment. In some systems, the automated adjustment of the screed head requires the use of multiple sensors and actuators along with the concomitant wiring and computerized control systems required to effect the necessary leveling adjustments.

Prior art screeding devices often comprise a frame having a centrally mounted turret from which a boom is extended. One such system is disclosed in U.S. Pat. No. 5,039,249 to Hansen et al. Turret type screeders provide for some maneuverability since the turrets are capable of rotation via a driven gear or similar mechanism. However, these screeding systems are typically quite complex and costly due to the need for complicated mechanical and electrical controls to rotate the turret and extend the boom, not to mention the power required to position a turret. In fact, while many prior art screeding devices are available, a great deal of concrete screeding is still accomplished by hand due to the size and cost of automated screeders.

Additionally, turret-type systems are extremely complex in terms of mechanical construction and control systems required for operation since they necessarily have a telescoping boom that extends from a central point of attachment to the screeder. In order to withstand the rigors of continuous use in construction environments, booms are typically comprised of a metal alloy which makes them quite heavy. As a result, when the boom is fully extended outwardly from the turret, there is some variation in the level of the screed head since a great deal of weight is secured to a single point of the screeding apparatus, namely the rotatable turret to which the terminal portion of the boom is secured.

Another disadvantage in prior art screeding systems is the inability to level the boom relative to the screed head and the frame or body of the system. In many prior art devices, a plurality of legs or outriggers are provided to level the frame of the apparatus, and then the screed head is set by leveling it relative to the boom to an appropriate finish grade height using the laser leveling process previously discussed. These systems typically approximate leveling the boom with respect to the frame in order to bring the screed head within a predetermined level tolerance for operational purposes. However, there remains a great deal of play or "slop" in the leveling process due to the size and weight of the boom and it's attachment to the screeder frame.

A further difficulty with many prior art screeding machines is the difficulty in positioning the screeder for a new screeding pass. Once the screeder boom is fully retracted and a screeding pass has been completed, the screeder must be reversed, moved sideways (parallel to the pour) and then repositioned proximate the next section of poured concrete to be screeded. While turret type machines facilitate this process by permitting the screeder to be moved parallel to the concrete pour, their complexity, expense and relatively poor ability to accurately level the finished surface make them undesirable.

Accordingly, there is a need in the art for a system and method screeding and troweling concrete that provides a consistently level finished surface with a minimum of mechanical and electrical system complexity and the ability to quickly move a screeder to an adjacent pour location.

Other features, objects and advantages of the present invention will become apparent from the detailed description of the drawing Figures taken in conjunction with the appended drawing Figures.

BRIEF DESCRIPTION OF THE DRAWING FIGURES

DETAILED DESCRIPTION OF THE PREFERRED EMBODIMENT(S)

Figure 1:
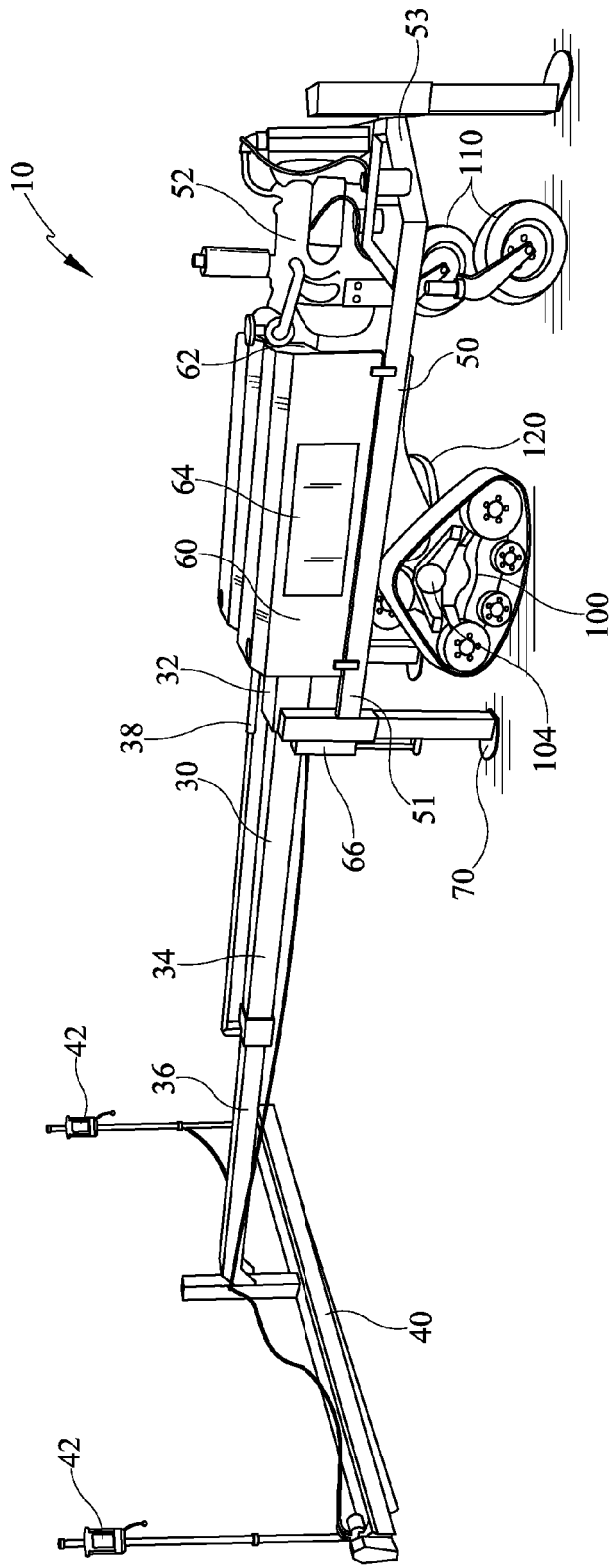
FIG. 1 is a perspective view of a concrete screeder with an extended boom in accordance with one embodiment of the present invention.
Figure 2:
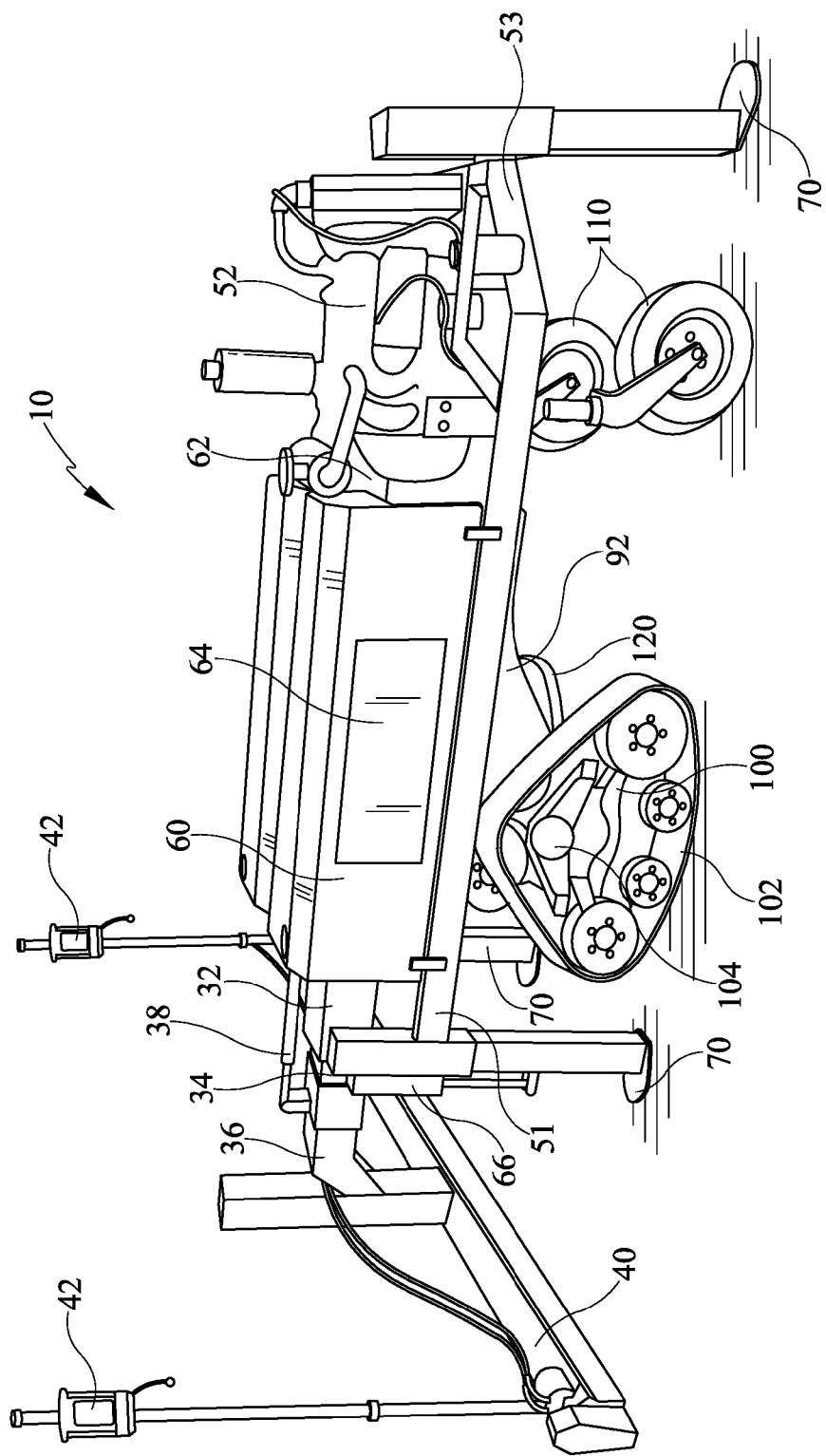
FIG. 2 is a perspective view of a concrete screeder with a retracted boom in accordance with one embodiment of the present invention.
Figure 3:
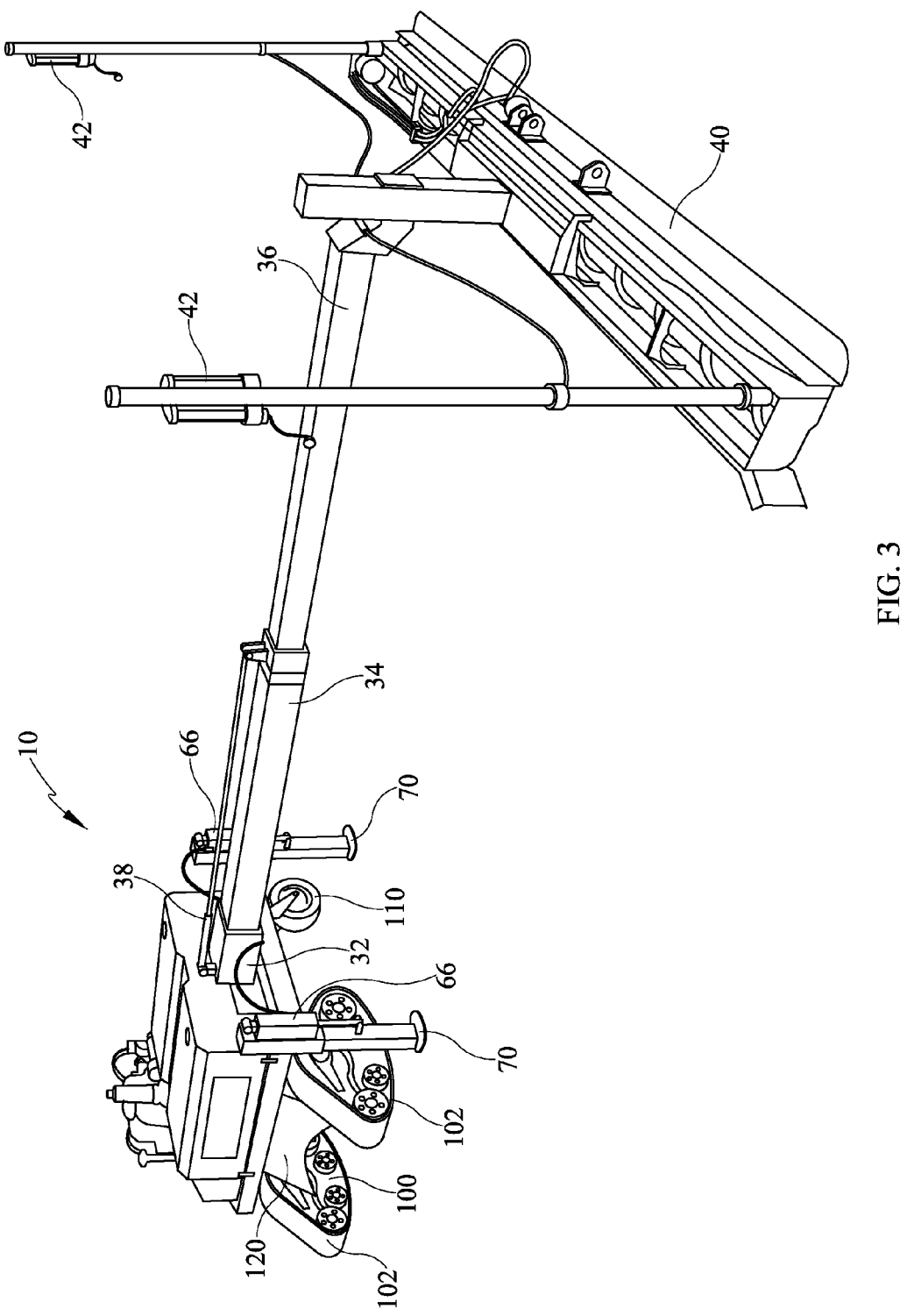
FIG. 3 is a perspective view of a concrete screeder in accordance with one embodiment of the present invention.
Figure 4:
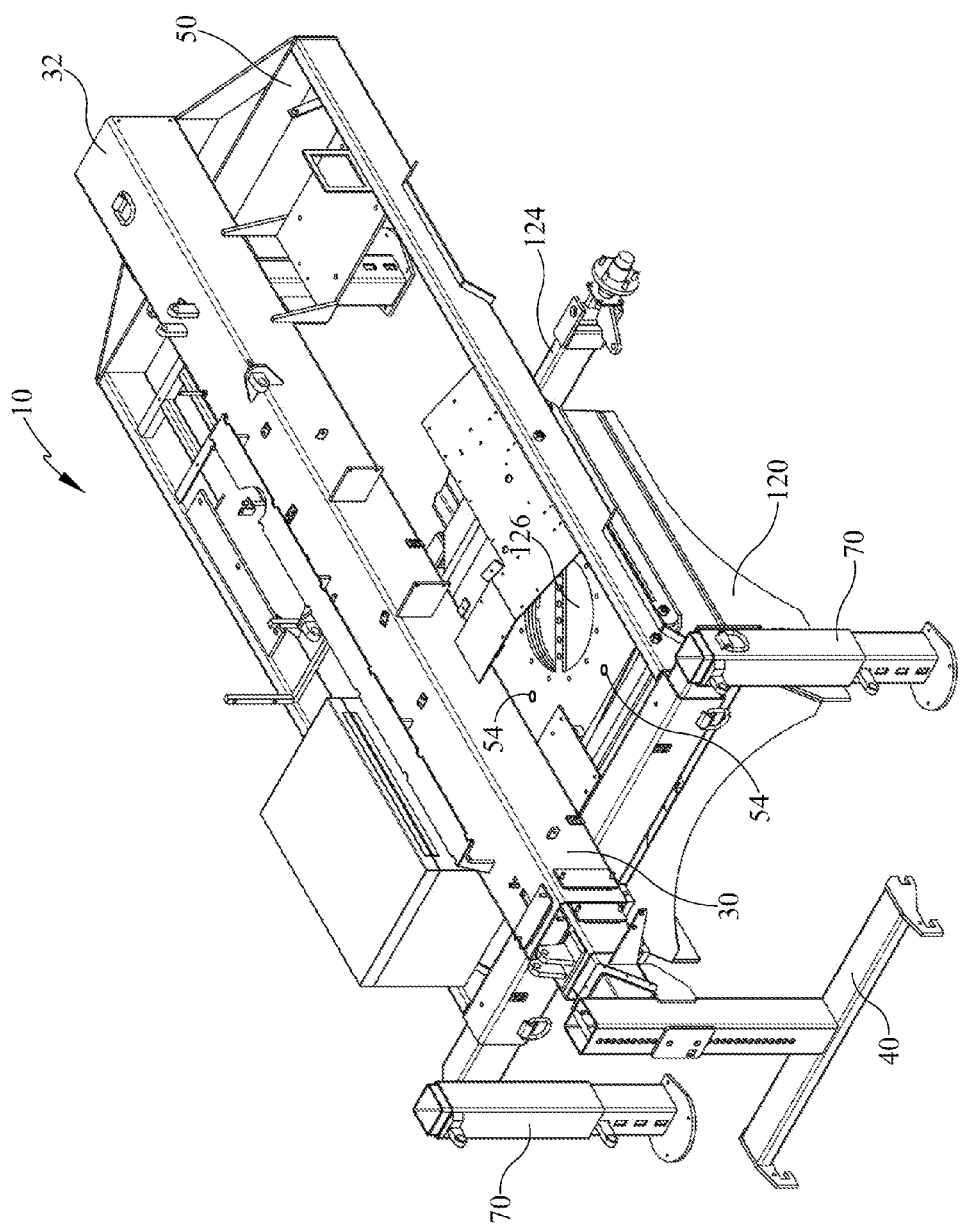
FIG. 4 is a perspective view of a concrete screeder frame assembly in accordance with one embodiment of the present invention.
Figure 5:
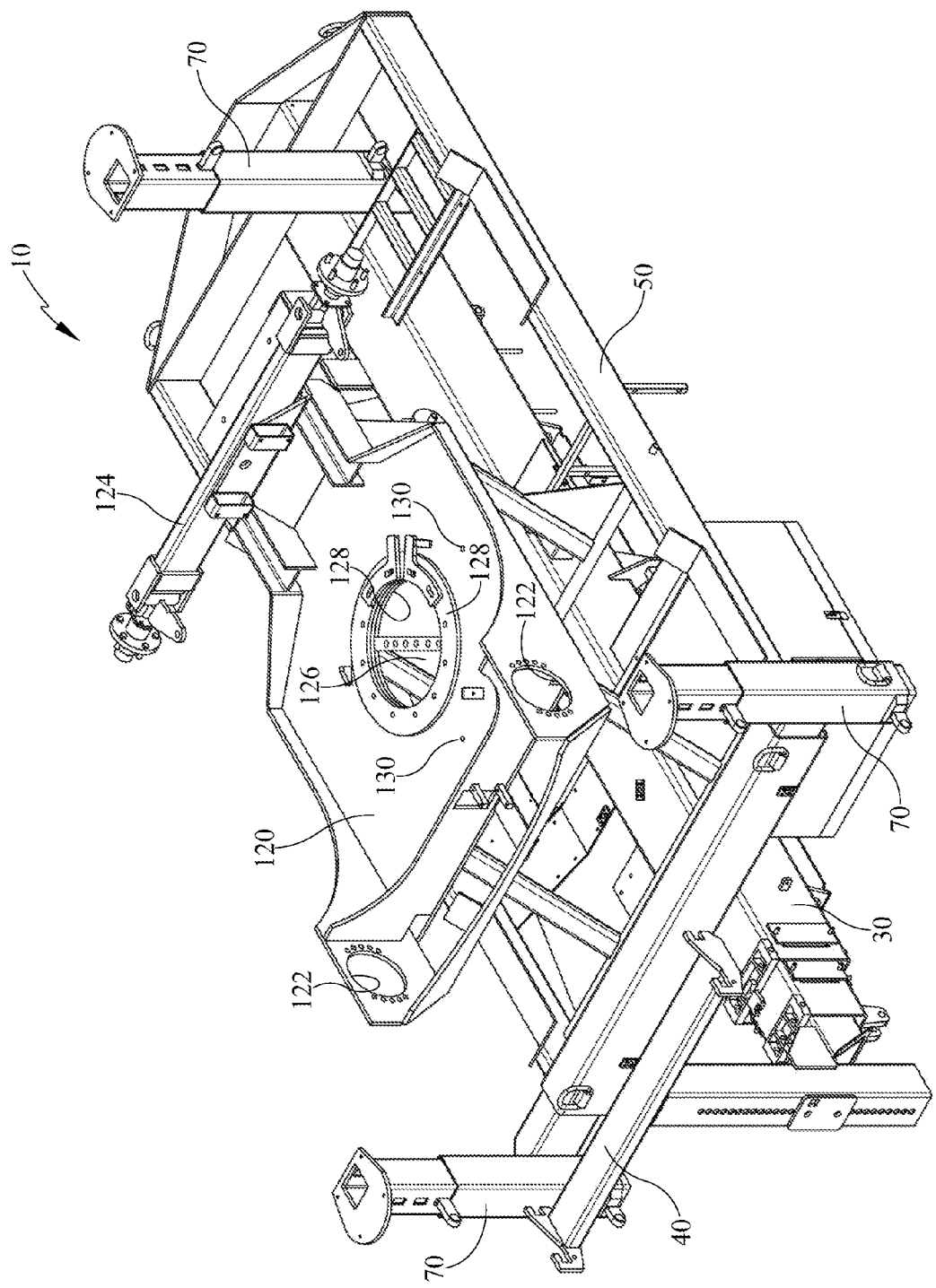
FIG. 5 is a perspective view of a concrete screeder frame assembly in accordance with one embodiment of the present invention.
Figure 6:
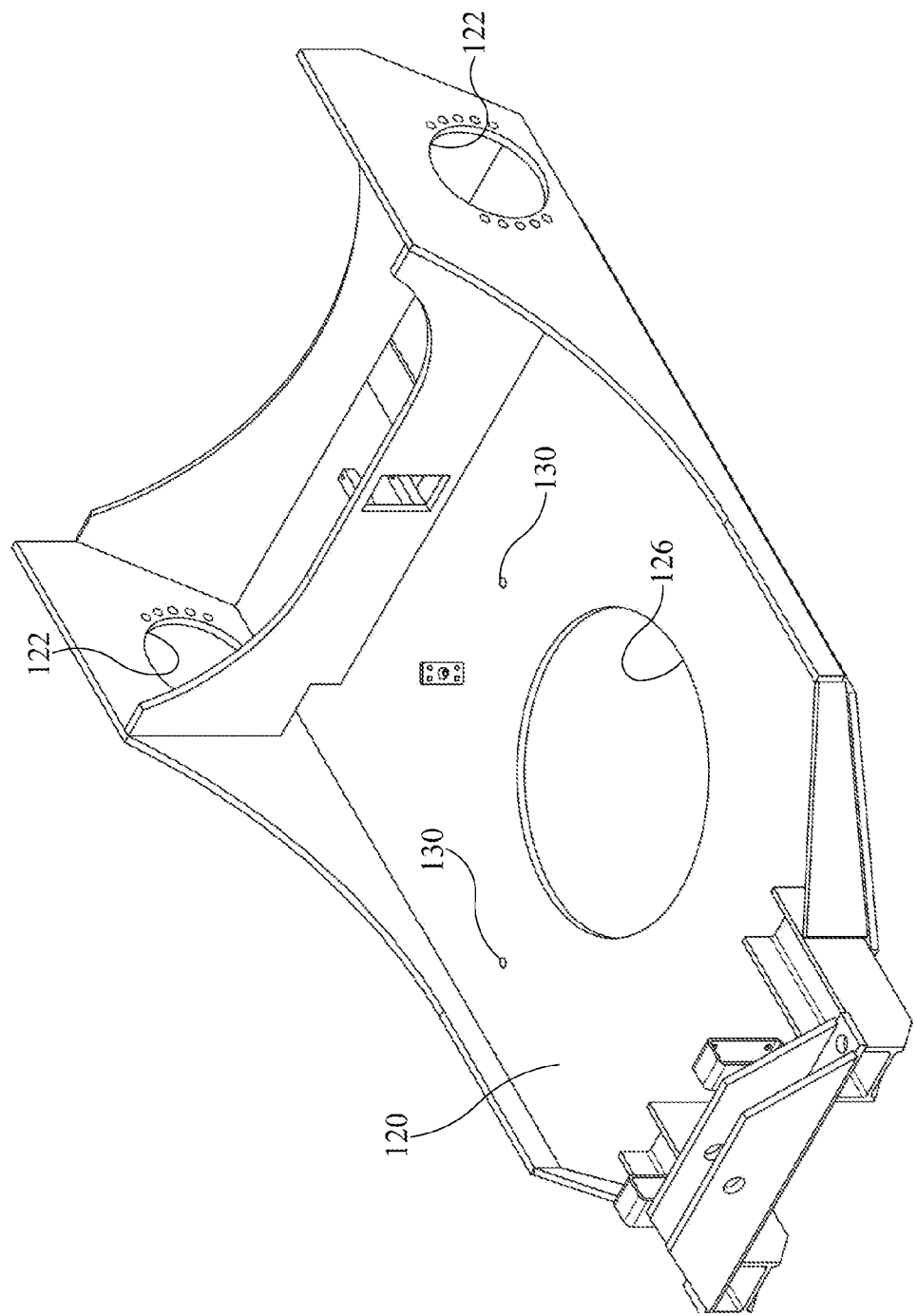
FIG. 6 is a perspective view of a concrete screeder undercarriage assembly in accordance with one embodiment of the present invention.
Figure 7:
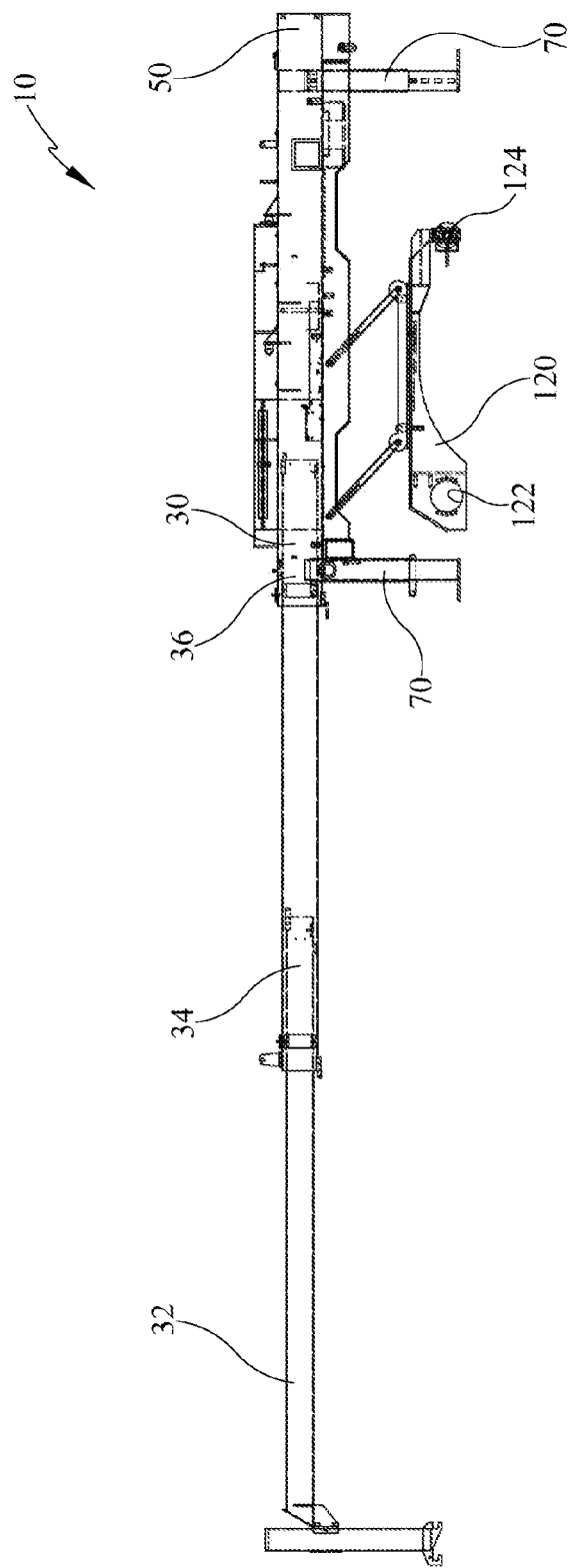
FIG. 7 is a perspective view of a concrete screeder frame assembly in accordance with one embodiment of the present invention.

Referring now to drawing FIGS. 1-3, and in accordance with one embodiment of the invention, the present invention overcomes the aforementioned difficulties in the prior art by providing a concrete screeding apparatus 10, known in the art as a screeder, having a telescopic boom assembly 30 and rigid frame assembly 50 that boom assembly 30 is secured directly thereto. The invention may also comprise a conventional internal combustion engine 52 having an output shaft coupled to an hydraulic assembly 60, for supplying pressurized hydraulic fluid to a plurality of components necessary to operate screeder 10 via a plurality of electrically actuated control valves.

The invention further includes a track-drive assembly 100 that is powered by pressurized hydraulic fluid, the track drive 100 being mounted on an undercarriage 120 such that it is rotatable with respect to frame 50, to allow screeder 10 to be moved "sideways", or parallel to a concrete pour. Furthermore, track-drive assembly 100 and undercarriage 120 are also rotatably mounted directly to rigid frame 50.

In one embodiment, the present invention comprises a telescopic boom assembly 30 having an exterior 32, intermediate 34 and interior 36 booms, wherein the intermediate 34 and interior 36 booms may be extended and retracted by means of a single hydraulic cylinder 38 supplied by pressurized fluid from hydraulic assembly 60. Exterior boom 32 is secured directly to frame assembly 50 so that when frame 50 is leveled, so is boom assembly 30.

Boom assembly 30 interior boom 36 is secured to a screed head 40 for smoothing and leveling poured concrete, the screed head having a plurality of leveling eyes 42 secured thereto which are used to level boom assembly 30 to a reference plane, thereby providing a level finished concrete surface as screed head 40 is retracted toward screeder 10. In one embodiment of the present invention leveling eyes 42 may comprise laser transmitters that emit light that is received by a receiver (not shown), thereby providing the ability to adjust paver head 40 to a reference plane, as is known in the art.

Referring again to drawing FIGS. 1-3 and in accordance with one embodiment of the present invention, a concrete screeding apparatus 10 comprises a rigid frame assembly 50 on which a conventional internal combustion engine 52 is mounted. Engine 52 supplies power via a conventional output shaft to an hydraulic assembly 60, also mounted on frame assembly 50. Hydraulic assembly 60 may typically include a pump 62 for pressurizing hydraulic fluid and a plurality of electrically actuated control valves (not shown) for supplying pressurized hydraulic fluid to a plurality of components as discussed in detail below.

Hydraulic assembly 60 may further comprise a control system (not shown) which may include a microprocessor, data memory, inputs and outputs, a wireless transceiver 64, and requisite wiring to electrically connect the control system to the plurality of valves. Throughout the specification the operation of hydraulic cylinders will be understood to be effected through the use of a conventional hydraulic system 60, comprising electrically actuated hydraulic valves and a control system for operating said valves, as is well-known to one of ordinary skill in the art.

A plurality of adjustable stabilization legs 70 are secured in a generally vertical orientation to frame assembly 50 at a plurality of points around the perimeter thereof. As shown in the drawing Figures, in one exemplary embodiment of the invention two opposed legs 70 are secured to frame assembly 50 at a forward end 51 thereof while a single leg 70 is secured to a rear end 53 of frame assembly 50. One of ordinary skill in the art will understand that the number and positioning of legs 70 around frame assembly 50 may be varied without departing from the scope of the present invention. Each leg 70 is further secured to an hydraulic cylinder 66 which is also secured to frame 50 at a point, and that is utilized to level boom assembly 30 with respect to a reference plane, thereby leveling entire screeding apparatus 10 as well as screed head 40. This feature of the instant invention provides an extremely level finished concrete surface, since boom 30 and screed head 40, once leveled, are unable to move with respect to a desired reference plane.

FIGS. 1-7 further depict a track drive system 100 rotatably secured to frame assembly 50 for maneuvering screeder 10. Track drive assembly 100 comprises a pair of spaced hydraulically driven tracks 102 and a pair of spaced un-driven pivotable wheels 110, both secured to an undercarriage 120. Tracks 102 may comprise an hydraulic motor 104 supplied with pressurized hydraulic fluid for rotating track 102 in either direction, thereby providing a motive force for screeder 10. Since each track 102 is driven by an independent hydraulic motor 104, tracks 102 are capable of being driven independently, thus providing screeder 10 with zero-radius turn capability. In one embodiment of the present invention, tracks 102 each have rubber track material and an internal suspension system (not shown). In a yet further embodiment of the invention, tracks 102 may comprise commercially available tracks such as those produced by Mattracks, Inc. of Karlstad, Minn.

As best seen in FIGS. 4-7, the invention 10 further comprises undercarriage 120 that includes a pair of spaced apertures 122 for mounting tracks 102 thereto, and an axle 124, spaced from said apertures 122, for mounting wheels 110. In an alternative embodiment of the invention, a single rear un-driven wheel 110 in place of axle 124 may also be secured to undercarriage 120 without departing from the scope of the invention. Undercarriage 120 further includes a central aperture 126 that is secured to frame assembly 50 through a pair of thrust plates 128 so that undercarriage 120 is rotatable with respect to frame assembly 50. Central aperture 126 may be utilized to route required hydraulic lines from pump 62 to hydraulic motors 104 on tracks 102. In a further embodiment of the present invention, undercarriage 120 includes a pair of pin apertures 130 that match corresponding apertures 54 in frame assembly 50 such that a clevis pin (not shown) may be inserted through apertures 130, 54 to limit rotation of undercarriage 120 with respect to frame assembly 50.

In operation, and as best seen in FIGS. 1 and 3, undercarriage assembly 120, and thus track drive assembly 100 and wheels 110, are readily rotated sideways, seen in FIG. 3, so that screeder 10 may be moved parallel to a concrete pour line. Track drive 100 assembly hydraulic motors 104 are supplied pressurized fluid from pump 62, thereby driving screeder 10 by operation of tracks 102. Undercarriage assembly may be locked into place using apertures 54 and 130 when track drive 100 is oriented in a forward direction, as shown in FIGS. 1 and 2, and also when track drive 100 is oriented in a sideways direction, as shown in FIG. 3.

One of ordinary skill in the art will understand that although some exemplary embodiments of screeder 10 utilize a boom-type screeding device, the track-drive 100 assembly disclosed herein may be employed with a variety of different screeder types without departing from the scope of the present invention. In one exemplary embodiment, track drive 100 assembly may be secured to a drive-in type screeder as well, for example a screeder with a fixed screed head that is simply raised and lowered while track drive 100 assembly pulls the blade across the surface being finished.

In operation, screeder 10 may be driven forward to approach a concrete pour, and legs 70 may be extended to stabilize and level screeder 10 while the boom assembly 30 is extended and screed head 40 engages the concrete surface. While legs 70 are extended, track drive 100 is lifted off the ground such that wheels 110 and tracks 102 are suspended in the air. At this point, undercarriage 120 may be easily rotated by hand to orient tracks 102 and wheels 110 parallel to the concrete pour surface. Once the screeder 10 pass is completed, legs 70 are then lowered and track drive assembly 100 can be utilized to move screeder 10 parallel to the pour surface to make another screed pass. Once in position, legs 70 are once again extended and screeder 10 operation continues as disclosed herein above.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. An apparatus for screeding concrete to produce a level finished surface comprising:
   a frame assembly;
   a boom assembly secured to said frame assembly at a first end and to a screed head at a second end;
   an undercarriage rotatably mounted to said frame assembly; and
   a drive assembly rotatably mounted to said undercarriage whereby said drive assembly and said undercarriage rotate independently of said frame assembly.

2. An apparatus as claimed in claim 1 comprising:
   a pivot rotatably securing said undercarriage to said frame assembly.

3. An apparatus as claimed in claim 1 comprising:
   a plurality of adjustable legs secured at a plurality of points to said frame assembly, said legs extendable to lift said frame assembly off said surface to enable rotation of said drive assembly.

4. An apparatus as claimed in claim 1 wherein said undercarriage is rotatably secured between said frame assembly and said drive assembly.

5. An apparatus as claimed in claim 2 wherein said pivot is a pair of thrust plates.

6. An apparatus as claimed in claim 2 wherein said pivot is a linear bearing.

7. An apparatus as claimed in claim 2 wherein said pivot is a spherical bearing.

8. An apparatus as claimed in claim 2 wherein said pivot is a bearing.

9. An apparatus as claimed in claim 1 wherein said drive assembly and said undercarriage can rotate up to 360 degrees.

* * * * *